Aug. 16, 1927.  
A. LONSON  
1,639,519

BRAKE DRUM AND LINING

Filed Aug. 13, 1925

WITNESSES
Chas. L. McDonald
E. N. Lovewell

INVENTOR
Albert Lonson
BY E. G. Siggers
ATTORNEY

Patented Aug. 16, 1927.

1,639,519

UNITED STATES PATENT OFFICE.

ALBERT LONSON, OF ULEN, MINNESOTA.

BRAKE DRUM AND LINING.

Application filed August 13, 1925. Serial No. 50,049.

This invention relates to an improved brake drum and lining, especially adapted for motor vehicles, its objects being to provide a brake which is efficient in its operation, inexpensive to manufacture, and in which the lining may be very easily replaced when worn.

The objects and advantages of the invention will be more fully explained in the following detailed description, which is to be considered in connection with the accompanying drawing illustrating the same.

Figure 1:
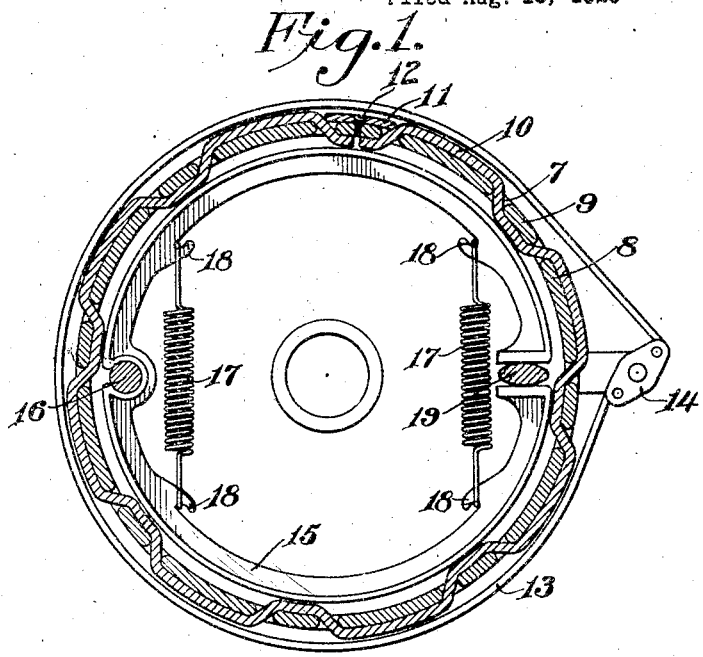
Figure 1 is a transverse section through a brake drum and lining constructed in accordance with the invention, the brake bands being shown in connection therewith.
Figure 2:
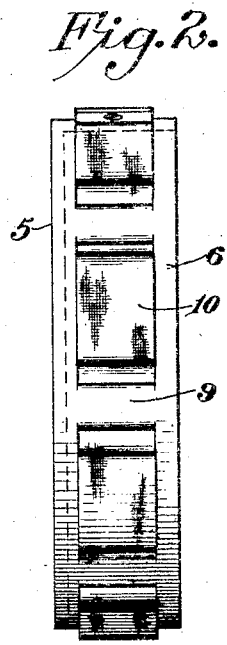
Figure 2 is a side elevation of the brake drum and lining detached.

In the form illustrated in Figures 1 and 2, the drum 5 is formed with a cylindrical portion 6 having a series of slots 7 therein forming a series of comparatively wide web portions 8, which alternate with a series of comparatively narrow web portions 9. A friction band or lining 10 is threaded through the slots 7, passing over the outer face of each web portion 8 and over the inner face of each web portion 9. A clamping strip 11 is secured to one of the web portions 9 by a screw 12, or other suitable means, so as to securely clamp the end portions of the lining 10 between the strip 11 and the adjacent edges of the web portions 8. The outer or service brake band 13 is of the usual type, consisting of a resilient steel strip connected at its ends to a pivoted member 14, which may be rocked to contract the band. The emergency brake comprises an inner band 15, mounted in the usual manner on a pin 16, and normally held out of engagement with the drum by the tension of springs 17, which are connected to lugs or hooks 18 formed on the inside of the band. The ends of the band 15 are engaged by a cam 19, which may be rocked to expand the same into engagement with the drum.

Figure 3:
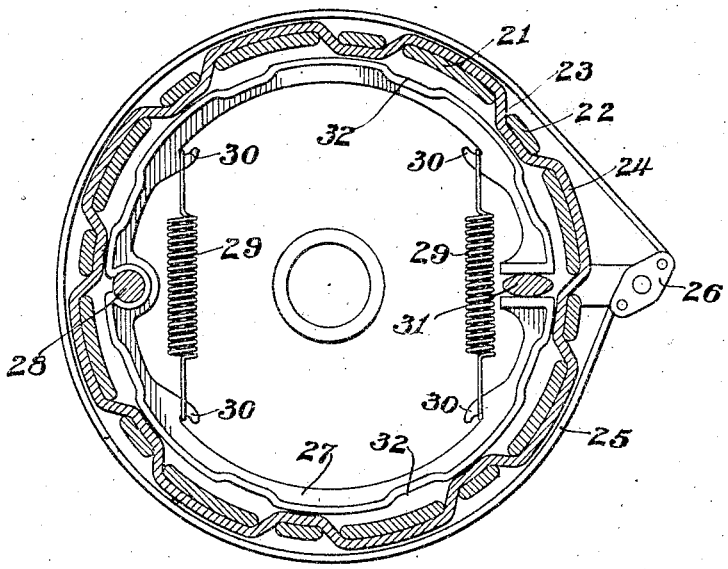
Figure 3 is a view similar to Figure 1, but showing a modified form of the invention.
Figure 4:
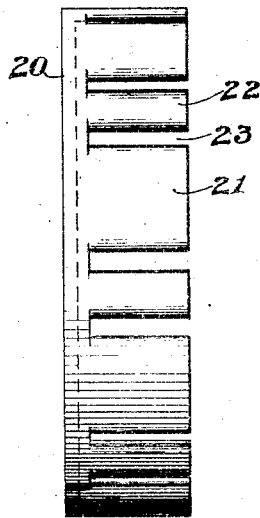
Figure 4 is a side elevation of the brake drum shown in Figure 3.

In the form shown in Figures 3 and 4, the peripheral portion of the drum 20 is separated by slots 23 into a series of comparatively wide segments 21, alternating with comparatively narrow segments 22. In this form, however, the slots extend to the edge of the drum, so that the lining 24 may be made in the form of an endless band which may be inserted from the side of the drum. This friction band, like the band 10, when in operative position, passes over the outer faces of the segments 21 and the inner faces of the segments 22. The usual resilient service band 25 is used to engage the outer face of the drum, and is adapted to be contracted by rocking the member 26 which is connected to its ends. The emergency or inner brake band 27 is mounted in the usual manner on the pin 28, and normally held out of contact with the drum by the tension of springs 29, which are connected to lugs or hooks 30 formed on the inside of the band. The ends of the band are engaged by a cam 31, which may be rocked to expand the band into engagement with the drum. In this form, however, the outer face of the band 27 is formed with a series of recesses 32, corresponding in number to the number of segments 22 and spaced the same distance apart, so that when the emergency brake is applied the portions of the lining 24, which pass over the inner faces of the segments 22, tend to engage in the recesses 32 to set or lock the wheels. This feature is of advantage, since the emergency brake is generally used to hold the automobile in a stationary position, and this result may be accomplished with a very small amount of pressure.

In a brake constructed according to the invention, it is to be noted that air spaces are left beneath the outer band 13 between the segments of lining 10 with which it engages. This permits greater pressure to be applied without causing the band or lining to become excessively heated. These air holes also permit the escape of any dirt or particles of gravel which may get under the band 13. Since the lining is carried on the rotating drum, the wear is evenly distributed throughout its entire circumference. Since the lining is not attached to the band, the latter is more flexible and more uniformly engages the surface against which it is drawn. Since the braking surface is outside of the lining instead of inside, the distance from the axis is greater, and the leverage correspondingly increased. When the lining becomes worn it may be very easily replaced, and few, if any, rivets are required. With the form shown in Figure 3, when the automobile is standing still and the emergency brake applied, the wheels are practically locked even though very little pressure is used in applying the brake.

While I have shown and described the construction of the invention in detail, it is to be understood that this is merely illustrative and that various other modifications may be made in the detailed construction of the various elements and the manner in which they are used without departing materially from the essential features of the invention. It is my purpose, therefore, to include all such modifications within the scope of the appended claims.

What is claimed is:

1. A brake for motor vehicles comprising, in combination, a substantially cylindrical drum presenting a series of slots, a relatively wide strip of brake lining threaded through said slots having alternating service brake and emergency brake portions on the outer and inner peripheries thereof and an emergency brake shoe having depressions therein to receive the inwardly projecting portions of the lining and tending to lock the drum positively against movement.

2. In a brake, the combination of a hollow drum having a series of slots through its peripheral portion, a friction element passing in and out through said slots, so that it passes alternately inside and outside of said peripheral portion, an inner brake band inside the drum and normally out of contact therewith, means for expanding said brake band, said brake band having recesses adapted to receive the inside portions of said friction element to lock the drum to the band, an outer brake band normally out of contact with the drum, and means for contracting the outer band to engage the outside portions of said friction element.

3. In a brake, the combination of a hollow drum having a series of slots through its peripheral portion forming a series of comparatively wide arcuate strips alternating with comparatively narrow ones, a friction element passing through said slots inside of each narrow strip and outside of each wide strip, an inner brake band inside the brake drum and normally out of contact with said friction element, means for expanding the inner brake band, said inner brake band having recesses adapted to receive the inside portions of said friction element to lock the drum to the band, and an outer brake band disposed in cooperative relation to the outside portions of said friction element.

4. In a brake, the combination of a hollow drum having a series of slots extending from one edge of its peripheral portion nearly to the other edge thereof to form a series of segments, a friction element passing in and out through said slots inside of alternate segments and outside of the other segments, an inner brake band inside the brake drum and normally out of contact therewith, means for expanding said brake band, said brake band having recesses adapted to receive the inside portions of said friction element to lock the drum to the band when the latter is expanded, and an outer brake band adapted to cooperate with the outside portions of said friction element.

5. In a brake, the combination of a hollow drum having a series of slots extending from one edge of its peripheral portion nearly to the other edge thereof and dividing the same into a series of comparatively wide segments alternating with comparatively narrow segments, a friction element passing through said slots inside of each narrow segment and outside of each wide segment, an inner brake band inside the drum and normally out of contact therewith and having recesses in its outer face corresponding in size and number to the narrow segments, means for expanding said inner brake band to cause said recesses to engage the narrow segments to lock the drum to the band, and an outer brake band adapted to cooperate with the outside portions of the friction element.

In testimony that I claim the foregoing as my own, I have hereto affixed my signature.

ALBERT LONSON.